US011016835B2

(12) United States Patent
Hoang et al.

(10) Patent No.: US 11,016,835 B2
(45) Date of Patent: May 25, 2021

(54) SYSTEM AND METHOD FOR IMPROVED HANDLING OF MEMORY FAILURES

(71) Applicant: DELL PRODUCTS, LP, Round Rock, TX (US)

(72) Inventors: Quy Hoang, Round Rock, TX (US); Wei G Liu, Austin, TX (US); Andy Butcher, Cedar Park, TX (US); Mark Shutt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 16/657,641

(22) Filed: Oct. 18, 2019

(65) Prior Publication Data

US 2021/0117257 A1    Apr. 22, 2021

(51) Int. Cl.
  *G06F 11/07*    (2006.01)
  *G06K 9/62*     (2006.01)
  *G06F 11/10*    (2006.01)

(52) U.S. Cl.
  CPC .......... *G06F 11/076* (2013.01); *G06F 11/073* (2013.01); *G06F 11/0772* (2013.01); *G06F 11/1044* (2013.01); *G06K 9/6256* (2013.01)

(58) Field of Classification Search
  CPC .............. G06F 11/076; G06F 11/1044; G06F 11/0772; G06F 11/073; G06K 9/6256
  See application file for complete search history.

(56) References Cited

U.S. PATENT DOCUMENTS

| | | | |
|---|---|---|---|
| 10,599,504 B1* | 3/2020 | BeSerra | G06F 11/0727 |
| 2008/0256400 A1* | 10/2008 | Yang | G06F 11/076 714/57 |
| 2008/0307273 A1* | 12/2008 | Nguyen | G06F 11/10 714/704 |
| 2016/0299808 A1* | 10/2016 | Yoshida | G06F 11/076 |
| 2019/0129777 A1* | 5/2019 | Rangarajan | G06F 11/0793 |
| 2019/0266036 A1* | 8/2019 | Franco | G06F 3/0653 |
| 2019/0266037 A1* | 8/2019 | Shah | G06F 13/24 |

OTHER PUBLICATIONS

X. Du, C. Li, S. Zhou, M. Ye and J. Li, "Predicting Uncorrectable Memory Errors for Proactive Replacement: An Empirical Study on Large-Scale Field Data," 2020 16th European Dependable Computing Conference (EDCC), Munich, Germany, 2020, pp. 41-46. (Year: 2020).*

* cited by examiner

*Primary Examiner* — Cynthia Britt
(74) *Attorney, Agent, or Firm* — Larson Newman, LLP

(57) ABSTRACT

An information handling system includes a dual in-line memory module (DIMM) coupled to a memory controller. The memory controller provides interrupts to a processor each time a read transaction from the DIMM results in a correctable read error. The processor instantiates a failure predictor that receives the interrupts, accumulates a count of the interrupts, and provides an error indication when the count exceeds an error threshold. In accumulating the count, the failure predictor increments the count each time the predictor receives a particular interrupt and decrements the count in accordance with an error leak rate. The error leak rate has a first value when a training coefficient for the DIMM is greater than a deviation threshold, and has a second value when the training coefficient for the DIMM is less than the deviation threshold.

20 Claims, 15 Drawing Sheets

310

| Warning = 8  Leak Rate = 5 | | | |
|---|---|---|---|
| Sequence | Error | Count | Warning |
| 1 | 1 | 1 | 0 |
| 2 | 0 | 1 | 0 |
| 3 | 0 | 1 | 0 |
| 4 | 0 | 1 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 1 | 1 | 0 |
| 12 | 1 | 2 | 0 |
| 13 | 1 | 3 | 0 |
| 14 | 1 | 4 | 0 |
| 15 | 1 | 4 | 0 |
| 16 | 1 | 5 | 0 |
| 17 | 0 | 5 | 0 |
| 18 | 0 | 5 | 0 |
| 19 | 0 | 5 | 0 |
| 20 | 0 | 4 | 0 |
| 21 | 0 | 4 | 0 |
| 22 | 0 | 4 | 0 |
| 23 | 0 | 4 | 0 |
| 24 | 1 | 5 | 0 |
| 25 | 1 | 5 | 0 |
| 26 | 0 | 5 | 0 |
| 27 | 1 | 6 | 0 |
| 28 | 0 | 6 | 0 |
| 29 | 1 | 7 | 0 |
| 30 | 1 | 7 | 0 |

320

| Warning = 8  Leak Rate = 10 | | | |
|---|---|---|---|
| Sequence | Error | Count | Warning |
| 1 | 1 | 1 | 0 |
| 2 | 0 | 1 | 0 |
| 3 | 0 | 1 | 0 |
| 4 | 0 | 1 | 0 |
| 5 | 0 | 1 | 0 |
| 6 | 0 | 1 | 0 |
| 7 | 0 | 1 | 0 |
| 8 | 0 | 1 | 0 |
| 9 | 0 | 1 | 0 |
| 10 | 0 | 0 | 0 |
| 11 | 1 | 1 | 0 |
| 12 | 1 | 2 | 0 |
| 13 | 1 | 3 | 0 |
| 14 | 1 | 4 | 0 |
| 15 | 1 | 5 | 0 |
| 16 | 1 | 6 | 0 |
| 17 | 0 | 6 | 0 |
| 18 | 0 | 6 | 0 |
| 19 | 0 | 6 | 0 |
| 20 | 0 | 5 | 0 |
| 21 | 0 | 5 | 0 |
| 22 | 0 | 5 | 0 |
| 23 | 0 | 5 | 0 |
| 24 | 1 | 6 | 0 |
| 25 | 1 | 7 | 0 |
| 26 | 0 | 7 | 0 |
| 27 | 1 | 8 | 1 |
| 28 | 0 | 8 | 1 |
| 29 | 1 | 9 | 1 |
| 30 | 1 | 9 | 1 |

*FIG. 3*

SYSTEM AND METHOD FOR IMPROVED HANDLING OF MEMORY FAILURES

FIELD OF THE DISCLOSURE

This disclosure generally relates to information handling systems, and more particularly relates to improved handling of memory failures.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a memory controller that may provide interrupts to a processor each time a read transaction from a dual in-line memory (DIMM) results in a correctable read error. The processor may instantiate a failure predictor that receives the interrupts, accumulates a count of the interrupts, and provides an error indication when the count exceeds an error threshold. In accumulating the count, the failure predictor may increment the count each time the predictor receives a particular interrupt and decrement the count in accordance with an error leak rate. The error leak rate may have a first value when a training coefficient for the DIMM is greater than a deviation threshold, and may have a second value when the training coefficient for the DIMM is less than the deviation threshold.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 3 is a chart showing exemplary workings of a leaky-bucket algorithm;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
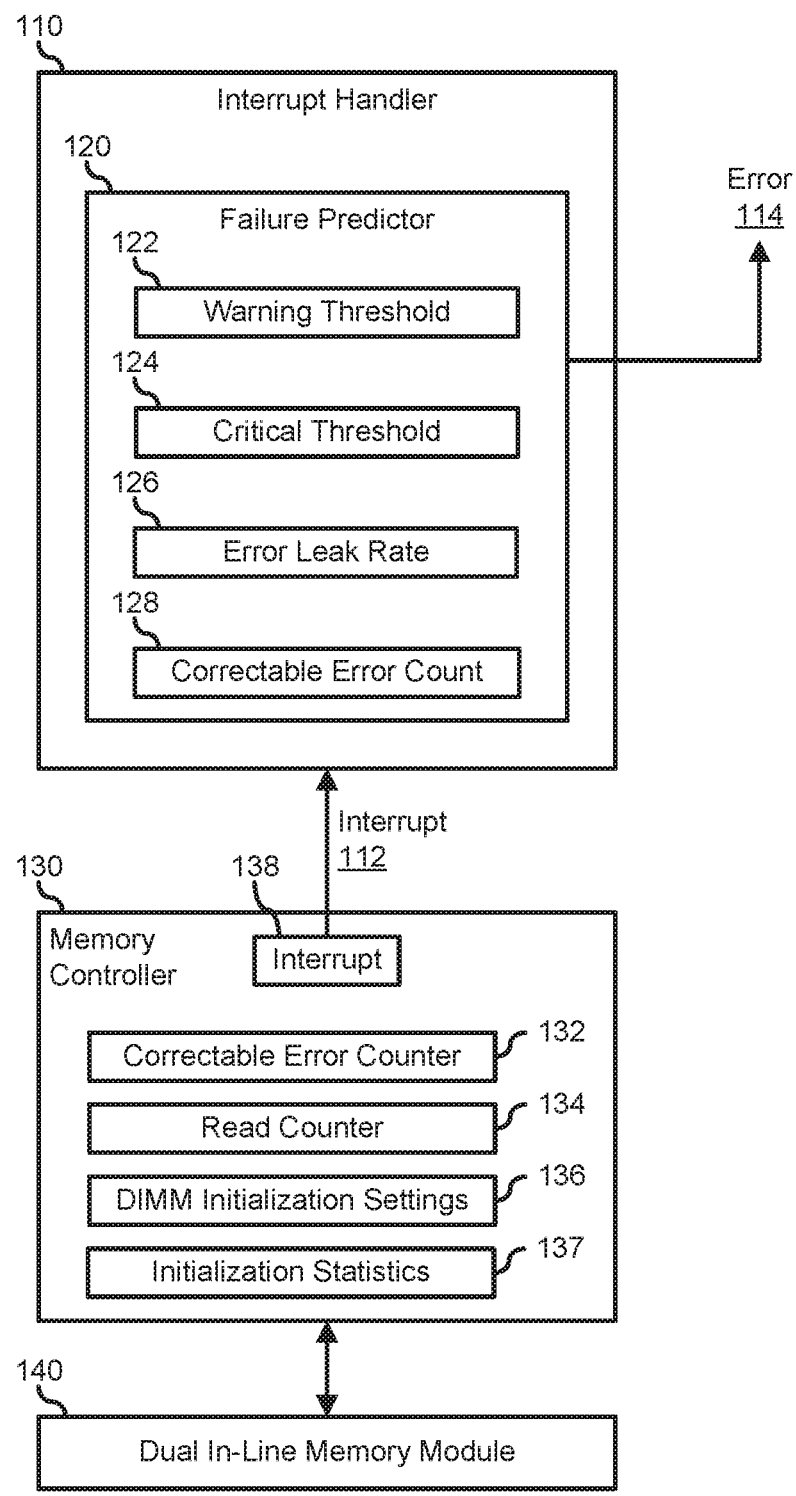
FIG. 1 is a block diagram illustrating an information handling system according to an embodiment of the present disclosure.

FIG. 1 illustrates an information handling system 100 including an interrupt handler 110, a memory controller 130, and a dual in-line memory module (DIMM) 140. Interrupt handler 110 represents a mechanism of information handling system 100 that permits the information handling system to respond to various events that occur in the information handling system. In particular, the occurrence of an event invokes a processor of the information handling system to execute an interrupt service routine to respond to the event. An event can be generated by a hardware device, a hardware exception, software instructions, or a software exception. An example of interrupt handler 110 includes a processor which implements a System Management Mode, where a hardware or software interrupt causes the processor to halt execution of code in the normal course of operation, and to instead execute an interrupt service routine associated with the particular hardware or software interrupt. In another example, interrupt handler 110 includes a processing element of information handling system 100 separate from the processor that is configurable to provide various manufacturer designed functionality to the information handling system, such as an Intel Innovation Engine, an Intel Management Engine, an AMD Secure Technology element, an AMD Platform Security Processor, or another processing element as needed or desired. The details of an interrupt handler are known in the art and will not be further described herein, except as needed to illustrate the embodiments of the present disclosure.

Memory controller 130 represents a portion of information handling system 100 that operates to manage the flow of information to the main memory of the information handling system, represented by DIMM 140. Memory controller 130 and DIMM 140 operate in accordance with a particular memory architecture implemented on information handling system 100. For example, memory controller 130 and DIMM 140 may operate in accordance with a Double-Data Rate (DDR) standard, such as a JEDEC DDR4 or DDR5 standard. It will be understood that, where memory controller 130 and DIMM 140 operate in accordance with the DDR5 standard, then the memory controller and DIMM will be configured to provide two separate memory channels.

Memory controller 130 operates to track various operational metrics in relation to the memory operations performed on DIMM 140. As such, memory controller 130 includes a correctable error counter 132, a read counter 134, a set of DIMM initialization settings 136, DIMM initialization statistics 137, and an interrupt generator 138. Memory controller 130 and DIMM 140 each operate to calculate error checking and correcting (ECC) bits associated with each memory read from the DIMM and with each memory write to the DIMM. It will be understood that, where memory controller 130 supports two or more DIMMs on a memory channel, or two or more memory channels, then the memory controller will include a separate a separate correctable error counter similar to correctable error counter 132, a separate read counter similar to read counter 134, separate DIMM initialization settings 136, and separate DIMM initialization statistics 137 for each DIMM supported by the memory controller.

When memory controller 130 issues a memory read to DIMM 140, the memory controller increments read counter 134. When memory controller 130 receives a data for a memory read transaction that includes error that can be corrected based upon the ECC bits, the memory controller increments correctable error counter 132 and interrupt generator 138 provides an interrupt 112 to interrupt handler 110 indicating that the memory controller has received a correctable error from DIMM 140. This interrupt can be called a correctable error interrupt. Correctable error counter 132, and read counter 134 can be read by the processor of information handling system 100, for example, in response to an interrupt service routine of interrupt handler 110, or by other mechanisms of the information handling system. The details of calculating ECC bits and the use of ECC to correct memory read and memory write errors is known in the art and will not be further discussed herein except as needed to illustrate the embodiments of the present disclosure.

During the expected lifetime of DIMM 140, correctable read errors are expected to occur periodically. In particular, system parameters, circuit margins, device aging, and other parameters can effect the signal integrity of the data being transmitted between DIMM 140 and memory controller 130, such that the data bits that were intended to be transmitted by the DIMM are mis-read by the memory controller. In general, as a DIMM ages, the number of correctable read errors is expected to increase due to circuit degradation, trace electro-migration, and other aging mechanisms in the memory cells and I/O circuits of the DIMM. Such age related correctable read errors may be correlated with an expected onset of the occurrence of uncorrectable read errors, which can lead to total system failure. As such, it is desirable to track the occurrence of correctable read errors and correlate the incidence rate of the correctable read errors to a prediction of when the DIMM is likely to fail. Then, when a DIMM is flagged as being likely to fail, a warning can be given that permits a data center service technician to proactively replace the flagged DIMM before uncorrectable errors become likely to occur on the DIMM.

Information handling system 100 operates to provide a prediction mechanism for when DIMM 140 may be likely to start exhibiting uncorrectable errors. In particular, interrupt handler 110 includes a failure predictor 120 that operates to provide progressive warnings as to the health of DIMM 140. Failure predictor 120 includes a warning threshold 122, a critical threshold 124, an error leak rate 126, and a correctable error count 128. Failure predictor 120 operates to implement a failure prediction algorithm to accumulate the number of correctable errors and to provide various warnings when the number of accumulated errors exceeds one or more of warning threshold 122 and critical threshold 124. An example of a failure prediction algorithm includes a leaky-bucket algorithm. In implementing the leaky-bucket algorithm, failure predictor 120 operates to increase the number of correctable errors accumulated in correctable error count 128, sometimes referred to as the "bucket," each time interrupt generator 138 of memory controller 130 generates a correctable error interrupt 112, and to periodically decrease the number of correctable errors accumulated in the correctable error count based upon error leak rate 126. Failure predictor 120 further operates to compare the number of collected correctable errors as found in correctable error count 128 with warning threshold 122 and with critical threshold 124. If the number of collected correctable errors exceeds warning threshold 122, then failure predictor 120 issues an error indication 114 indicating that the number of collected correctable errors exceeds the warning threshold. If further, the number of collected correctable errors continues to increase and exceeds critical threshold 124, then failure predictor 120 issues an error indication 166 indicating that the number of collected correctable errors exceeds the critical threshold. When information handling system 100 receives either error warnings 114, the information handling system can provide an indication to a data center service technician that the DIMM is likely to fail. Note that a failure predictor similar to failure predictor 110 can be implemented in interrupt handler 110 for each DIMM 140 of information handling system 100, and the parameters of the warning threshold, the critical threshold, and the error leak rate can be set individually for each DIMM based upon the type of DIMM, the age of the DIMM, the number of reads that have been experienced by the DIMM, or in accordance with other parameters of the DIMMs, as needed or desired. It will be further understood that error leak rate 126 may also include a number of errors by which to decrement correctable error counter 128 that is greater than or equal to one, as needed or desired.

Figure 2:
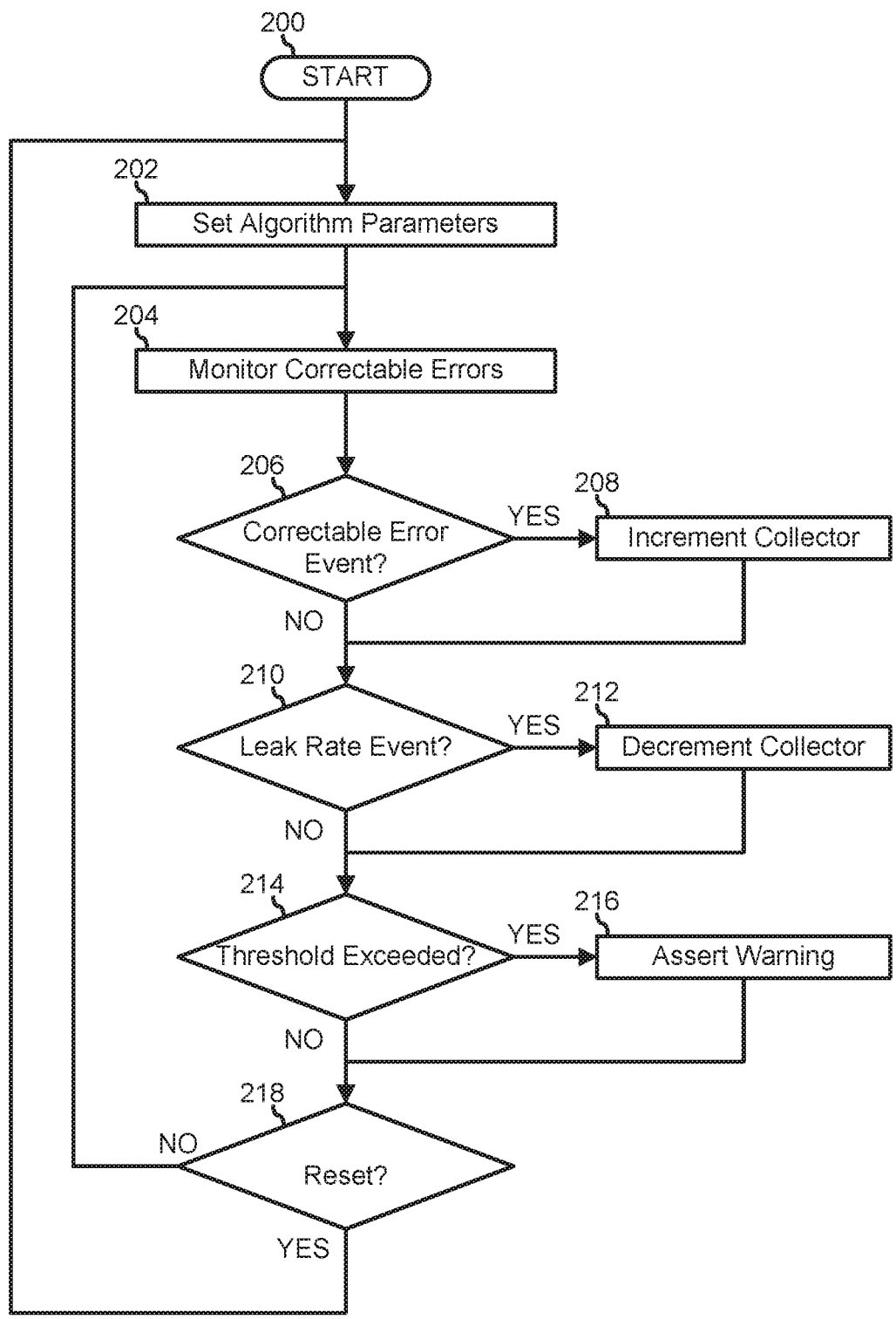
FIG. 2 is a flowchart illustrating a method for controlling memory failure handling in a DIMM of the information handling system of FIG. 1.

FIG. 2 illustrates a method for controlling memory failure handling starting at block 200. Parameters for a leaky-bucket algorithm are set in block 202. For example, during a system boot process of information handling system 100, warning threshold 122, critical threshold 124, and error leak rate 126 can be set to implement a leaky-bucket algorithm for each DIMM 140 in the information handling system. Correctable errors are monitored in block 204. For example, when memory controller 130 detects a correctable error, interrupt generator 138 can issue an interrupt to failure predictor 120. A decision is made as to whether or not a correctable error event has been detected in decision block 206. If so, the "YES" branch of decision block 206 is taken, a correctable error count is incremented in block 208, and the method proceeds to decision block 210. For example, if a correctable error interrupt is received by failure predictor 120, a system BIOS can read correctable error counter 132 and store the value to correctable error count 128, and the failure predictor can the increment correctable error count. If a correctable error event has not been detected, the "NO" branch of decision block 206 is taken and a decision is made as to whether or not a leak rate event has occurred in decision block 210.

If so, the "YES" branch of decision block 210 is taken, a correctable error count is decremented in block 212, and the method proceeds to decision block 214. For example, if a number of leak events that is equal to error leak rate 126 have transpired, then failure predictor 120 can decrement correctable error count 128. If a leak rate event has not 0occurred, the "NO" branch of decision block 210 is taken and a decision is made as to whether or not an error threshold has been exceeded in decision block 214. If so, the "YES" branch of decision block 214 is taken, a warning is asserted in block 216, and the method proceeds to decision block 218. For example, correctable error count 128 can exceed one of warning threshold 122 or critical threshold 124 and failure predictor 120 can issue error indication 114. If the error threshold has not been exceeded, the "NO" branch of decision block 214 is taken and a decision is made as to whether or not a system reset has occurred in decision block 218. If not, the "NO" branch of decision block 218 is taken and the method proceeds to block 204 where correctable errors are monitored. If a system reset has occurred, the "YES" branch of decision block 218 is taken and the method proceeds to block 202 where parameters for the leaky-bucket algorithm are set.

FIG. 3 illustrates an embodiment of the workings of the leaky-bucket algorithm as provided by failure predictor 120, or by the method of FIG. 2. A sequence of 30 events is shown with a particular error pattern associated with the sequence, the error count collected during each event of the sequence, and an indication for each sequence as to whether or not an error warning is issued. An example of the sequence of events upon which the leak rate is based can include an elapsed time, a number of transactions on the memory interface, a number of read transactions on the memory interface, or another event as needed or desired. In a first case 310, a warning threshold is set at eight (8) errors, and the leak rate is set to decrement the counter every five (5) events. It will be noted that in this case, at no event does the error count equal eight (8) errors, and so no error warning is issued, because the error leak rate of five (5) events provides a high frequency of decrementing events. In a second case 320, a warning threshold is set at eight (8) errors, and the leak rate is set to decrement the counter every 10 events. It will be noted that in this case, with the same error pattern as the first case, the error count eventually equals and exceeds the eight (8) error threshold, and the error warning is issued, because the error leak rate of 10 events provides a lower frequency of decrementing events.

As noted above, as a DIMM ages, the expected rate of received correctable read errors is expected to increase. As such, for a newer DIMM, the first case 310 may provide for optimal performance without unduly signaling that number of correctable read errors is too high, while the second case 320 may result in an excessive number of errors, and so setting a faster leak rate (i.e., a lower number) for a newer DIMM may be more desirable. On the other hand, for an older DIMM, the second case 320 may provide for optimal performance by more frequently signaling that the number of correctable read errors is too high, while the first case 310 may mask an increase in correctable read errors that would otherwise give a more advanced warning of impending failure of the DIMM, and so setting a slower leak rate (i.e., a higher number) for an older DIMM may be more desirable.

Figure 4:
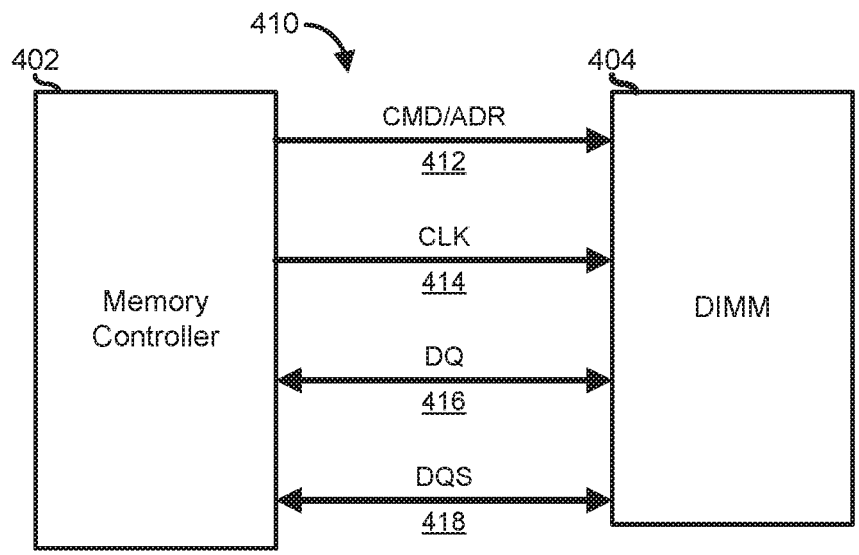
FIG. 4 is a block diagram of an information handling system according to an embodiment of the present disclosure.

FIG. 4 illustrates an information handling system 400 including a memory controller 402, and a dual in-line memory module (DIMM) 404. Memory controller 402 and DIMM 404 are coupled together via a memory channel 410. Hereinafter, memory controller 402, DIMM 404, and memory channel 410 may be referred to as the memory subsystem. Memory controller 402 represents a portion of information handling system 400 that operates to manage the flow of information to the main memory of the information handling system, represented by DIMM 404. Memory controller 402 and DIMM 404 operate in accordance with a particular memory architecture implemented on information handling system 400. For example, memory controller 402 and DIMM 404 may operate in accordance with a Double-Data Rate (DDR) standard, such as a JEDEC DDR4 or DDR5 standard. It will be understood that, where memory controller 402 and DIMM 404 operate in accordance with the DDR5 standard, then the memory controller and DIMM will be configured to provide two separate memory channels similar to memory channel 410.

Memory channel 410 includes a command/address/control bus (CMD/ADR) 412, a clock (CLK) 414 for timing of the signals on the CMD/ADR bus, a data bus (DQ) 416, and a data strobe (DQS) 418 for of the signals on the DQ bus. When information handling system 400 is powered up, for example during a Power-On Self Test (POST) of a system boot process performed by a Basic Input/Output System (BIOS) or Universal Extensible Firmware Interface (UEFI) of the information handling system, the information handling system performs several predefined procedures to ensure that the memory subsystem is configured to provide an optimal level of data transmission reliability and to ensure the highest possible operational bandwidth.

Figure 5:
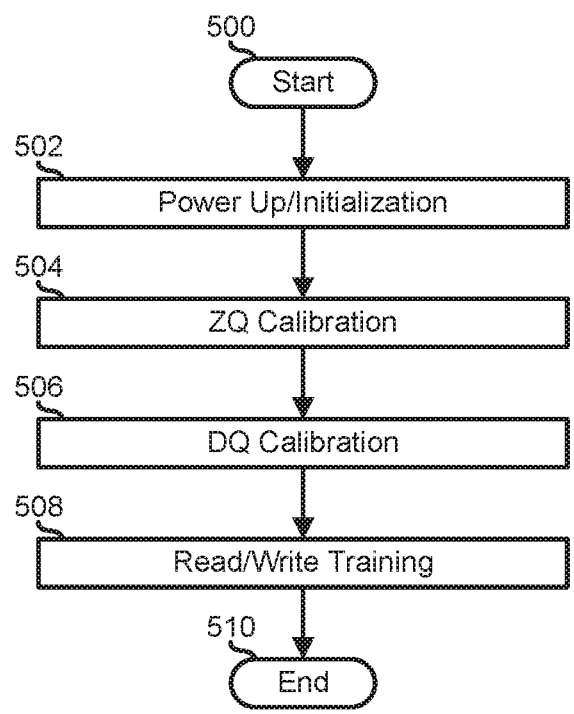
FIG. 5 is a flowchart illustrating a method for memory training according to an embodiment of the present disclosure.

FIG. 5 illustrates the procedures that information handling system 400 performs to initialize the memory subsystem, starting at step 500 where the information handling system is powered up, or otherwise brought out of a reset state. At step 502, information handling system 400 enters a power-up and initialization stage where power is applied to memory controller 402 and to DIMM 404, a RESET signal for a processor of the information handling system is deasserted, a system clock tree is enabled, and mode registers of the DIMM are initialized. At this point, the memory subsystem is configured with a desired operating frequency, and various fixed timing parameters, such as the CAS latency, the CAS write latency, and other parameter, are configured. The details of memory channel initialization are known in the art and will not be further disclosed herein except as needed to illustrate the present embodiments.

At step 504, information handling system 400 enters a "ZQ Calibration" stage where the termination resistors for the data lines of DQ 416 within memory controller 402, and within each Dynamic Random Access Memory (DRAM) device of DIMM 404 are calibrated. Here, due to the nature of the CMOS termination circuits within memory controller 402 and within the DRAM devices of DIMM 404, the termination resistances are sensitive to voltage and temperature changes, and so are designed to be tunable based upon a comparison of the tuned termination resistance to an external high precision reference resistor (not illustrated). During the ZQ Calibration stage of step 504, a process is performed to determine an optimum tuning value to apply to the CMOS termination circuits. In particular, one or more parallel resistances within the CMOS termination circuits of each data line are selected to be turned on to tune the termination resistance. Thus the result of the ZQ Calibration stage of step 504 is to determine a number of tuning resistances to be turned on for each data lane in each DRAM on DIMM 404. The number of tuning resistances is programmed into the mode registers of DIMM 404. The details of ZQ Calibration are known in the art and will not be further disclosed herein except as needed to illustrate the present embodiments.

At step 506, information handling system 400 enters a "Vref Calibration" stage where a reference voltage for determining whether a data "0" or a data "1" is received by a receiver on the lines of DQ 416. The result of the Vref Calibration stage of step 506 is to determine a reference voltage setting for each DRAM on DIMM 404. The reference voltage settings are programmed into the mode registers of DIMM 404. The details of DQ Calibration are known in the art and will not be further disclosed herein except as needed to illustrate the present embodiments.

At step 508, information handling system 400 enters a "Read/Write Training" stage where various timings are set on the memory subsystem. In particular, CLK 414 and DQS 418 are aligned, read and write delays at DIMM 404 are determined, a data eye for memory reads is centered, and any detected signal integrity errors in memory read operations and memory write operations are reported. Algorithms for Read/Write Training may include write leveling, Multi-Purpose Register (MPR) pattern writes, read centering, write centering, and the like. The settings from the Read/Write Training are programmed into the mode registers of DIMM 404. The details of Read/Write Training are known in the art and will not be further disclosed herein except as needed to illustrate the present embodiments.

The procedures for initializing the memory subsystem are completed in step 510 and information handling system 400 is ready for memory operations. In some cases, periodic recalibration of the memory subsystem is performed. In particular, ZQ calibration and read centering may be performed on a periodic basis, such as every hour, every day, or on the basis of another period of time. Further, recalibration of the memory subsystem can be performed when changes in an operating voltage on information handling system 400, or changes in an operating temperature of one or more of the memory controller, the DIMM, or the memory channel are detected. Note that such periodic recalibration, or recalibration due to the operating conditions of information handling system 400 are performed during run time operation, and are not considered as a part of the system boot process.

In a particular embodiment, when a BIOS/UEFI of information handling system 400 executes an initial boot process on the information handling system, the system boot process operates to initialize the memory subsystem as described above, and to retain the initialization settings in a non-volatile storage area. Returning to FIG. 1, memory controller 130 stores the DIMM initialization settings into DIMM initialization settings 136. In addition, memory controller 130 operates to accumulate the DIMM initialization settings from a number of system boot processes to determine statistics associated with the aggregate of the system boot processes. For example, memory controller can operate to keep a running average for each of the DIMM initialization settings. Memory controller 130 operates to store the accumulated statistics for the system boot processes in DIMM initialization statics 137. For example, memory controller 130 can operate, on each iteration of the system boot process and for each IDMM initialization setting, to read average the value of a particular DIMM initialization setting for the current system boot process with the value of the particular DIMM initialization setting and to store the new average into DIMM initialization statistics 137. As such, DIMM initialization statistics can include a number of system boot processes associated with the average value in DIMM initialization statistics 137. The stored number of system boot processes can be incremented each time memory controller 130 operates to calculate the averages for the DIMM initialization settings.

It has been understood by the inventors of the present embodiments that DIMM initialization settings my potentially provide valuable insight into the changing conditions and characteristics of an information handling system. In particular, where an information handling system utilizes a "leaky bucket" algorithm to count correctable errors and flag warning and critical level thresholds, errors on the memory interface may be produced by various conditions, such as temperature, device drift over time, connection faults due to aging or reseating, etc. Such errors on the memory interface may be indicated as deviations in the DIMM initialization settings from normal or average DIMM initialization settings.

In a particular embodiment, when information handling system 100 performs a system boot process, the system BIOS operates to compare a set of DIMM initialization settings for a given system boot process (the current DIMM initialization settings) with the running average for the DIMM initialization settings of previous system boot processes. The system BIOS calculates a difference between each current DIMM initialization setting and the running average of the DIMM initialization setting, and determines if the difference is within a predetermined threshold level. The system BIOS operates to dynamically maintain the settings for warning threshold 122, critical threshold 124, and error leak rate 126 for DIMM 140 based upon whether or not the difference is within the predetermined threshold level. If the difference is within the predetermined threshold level, then the system BIOS retains the settings for warning threshold 122, critical threshold 124, and error leak rate 126 for DIMM 140 that were utilized on previous system boot processes. On the other hand, if the difference is not within the predetermined threshold level, then the system BIOS modifies one or more of the settings for warning threshold 122, critical threshold 124, and error leak rate 126 for DIMM 140 from the settings utilized on previous system boot processes. For example, a DIMM that trains outside of its historical norm for a particular DIMM initialization setting may be indicative of a signal integrity anomaly that lie somewhere other than the DIMM, and so the warning threshold, the critical threshold, or the error leak rate can be adjusted up to avoid unwarranted device replacement. Similarly, where a DIMM typically trains with tight and repeatable DIMM initialization settings, one or more of the warning threshold, the critical threshold, or the error leak rate can be adjusted down, because the occurrence of memory errors are more likely to indicate issues with the DIMM itself. An example of a predetermined threshold level may include a percentage of deviation, such as one or two standard deviations, an absolute deviation value, or the like, as needed or desired.

In a particular embodiment, when information handling system 100 performs a system boot process, the system BIOS operates to set warning threshold 122, critical threshold 124, and error leak rate 126 for DIMM 140 based upon SPD data read from DIMM 140. In a particular case, the SPD data can include manufacturer suggested settings and thresholds. In another case, the system BIOS can be configured to download suggested settings and thresholds from a third-party server. In another case, the system BIOS is programmed with the settings and thresholds. In yet another case, the system BIOS can obtain the suggested settings and thresholds by one of the above methods, and can be configured to modify the suggested settings and thresholds, as needed or desired. In another case, the system BIOS can be configured to update the settings and thresholds on a periodic basis, such as at a particular time each day, at a particular time each week, after a particular duration of time has elapsed, or after another periodic interval, as needed or desired.

In another embodiment, failure predictor 120 operates to set warning threshold 122, critical threshold 124, and error leak rate 126 based upon SPD data read from DIMM 140. For example, failure predictor 120 can read manufacturer suggested settings and thresholds from DIMM 140. In another case, failure predictor 120 can be configured to download suggested settings and thresholds from a third-party server. In another case, failure predictor 120 is programmed with the settings and thresholds. In yet another case, failure predictor 120 can obtain the suggested settings and thresholds by one of the above methods, and can be configured to modify the suggested settings and thresholds, as needed or desired. In another case, failure predictor 120 can be configured to update the settings and thresholds on a periodic basis, such as at a particular time each day, at a particular time each week, after a particular duration of time has elapsed, or after another periodic interval, as needed or desired. In any of the above embodiments or cases, failure predictor 120 can be prompted to set the settings in response to a correctable error interrupt.

Figure 6:
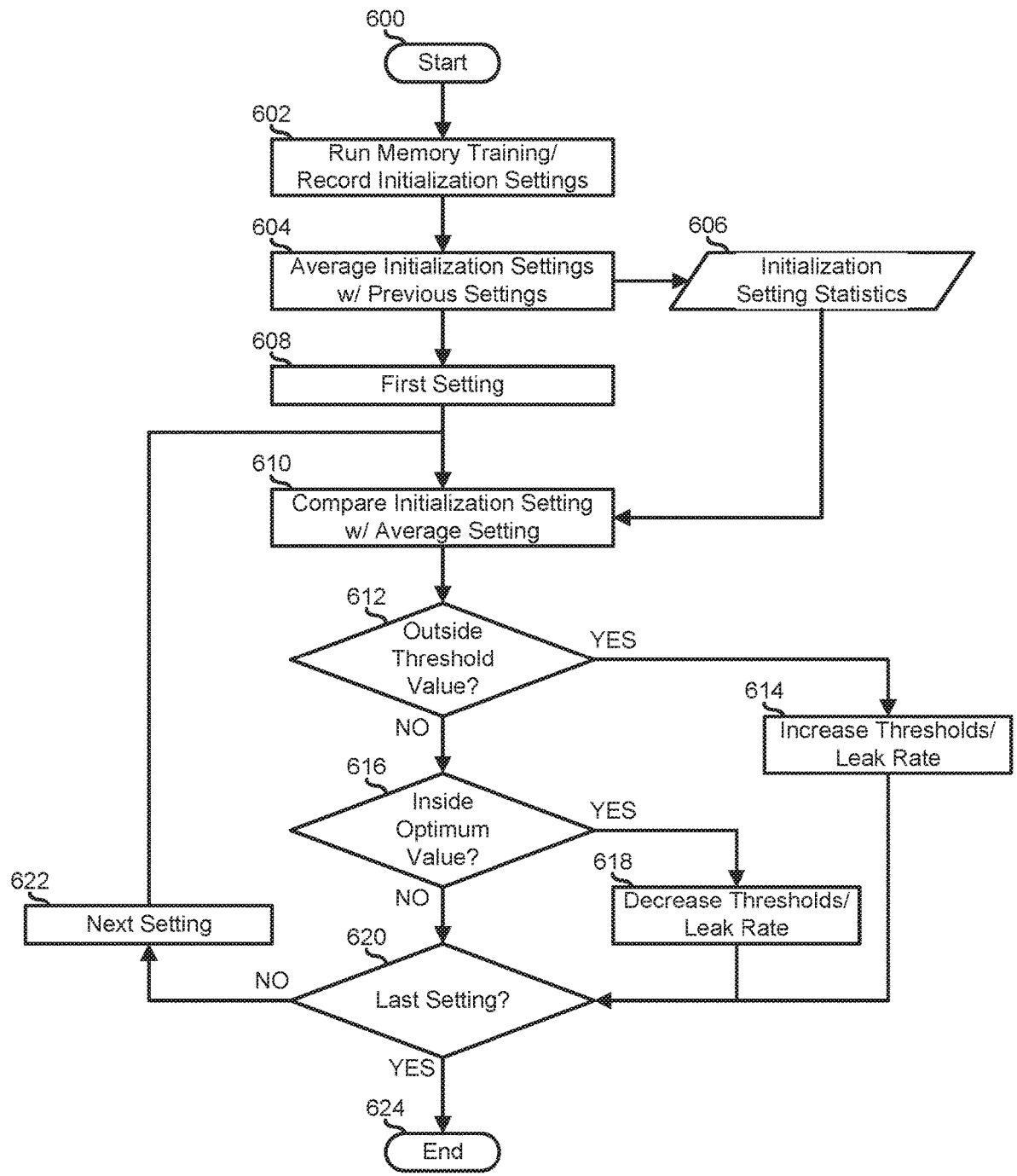
FIG. 6 is a flowchart illustrating a method for enhanced prediction of memory failures according to an embodiment of the present disclosure.

FIG. 6 illustrates a method for enhanced prediction of memory failures starting at block 600. A system BIOS initiates a system boot process, runs memory training on DIMMs in an information handling system, and records the resulting initialization settings in a non-volatile memory of the information handling system in block 602. A failure predictor of the information handling system averages the current initialization settings with previous initialization settings in block 604, and stores the averaged values in the non-volatile memory at block 606.

A first setting of the initialization settings is selected in block 608. The average value for the selected initialization setting is retrieved from the non-volatile memory at block 606 and is the current value for the selected initialization setting is compared with the average value for the initialization setting in block 610. A decision is made as to whether or not the current value for the initialization setting is outside a threshold value as compared with the average value for the initialization setting in decision block 612. For example, a decision can be made as to whether or not the current value for the initialization setting is outside of one or two standard deviations of the average value, or whether or not the current value for the initialization setting is outside of a predetermined range. If the current value for the initialization setting is outside the threshold value, the "YES" branch of decision block 612 is taken, one or more parameters for an error detection algorithm are increased in block 614, and the method proceeds to decision block 620 as described below.

For example, when the current value for the initialization setting is outside the threshold value, one or more of a warning level, a critical level, and a leak-rate for a leaky bucket algorithm can be increased. Here the fact that the selected initialization setting is outside of the threshold value may indicate that problems exist that are not related to the particular memory device, and so, the leaky-bucket algorithm can be relaxed because the occurrence of memory errors are less likely to indicate a memory device failure.

If the current value for the initialization setting is not outside the threshold value, the "NO" branch of decision block 612 is taken, and a decision is made as to whether or not the current value for the initialization setting is inside an optimum value as compared with the average value for the initialization setting in decision block 616. For example, a decision can be made as to whether or not the current value for the initialization setting is closer to a predetermined optimum value. If the current value for the initialization setting is inside the optimum value, the "YES" branch of decision block 616 is taken, one or more parameters for an error detection algorithm are decreased in block 618, and the method proceeds to decision block 620 as described below. For example, when the current value for the initialization setting is inside the optimum value, one or more of a warning level, a critical level, and a leak-rate for a leaky bucket algorithm can be decreased. Here the fact that the selected initialization setting is inside of the optimum value may indicate that the memory channel is operating well, and so, the leaky-bucket algorithm can be tightened because the occurrence of memory errors are more likely to indicate a memory device failure. If the current value for the initialization setting is not inside the optimum value, the "NO" branch of decision block 616 is taken and the method proceeds to decision block 620.

After the parameters for the error detection algorithm are increased in block 614, after the parameters for the error detection algorithm are decreased in block 618, or after the "NO" branch of decision block 616 is taken, a decision is made as to whether or not the selected initialization setting is the last initialization setting in decision block 620. If not, the "NO" branch of decision block 620 is taken, a next initialization setting is selected in block 622, and the method returns to block 610 where the average value for the new initialization setting is retrieved from the non-volatile memory at block 606 and the current value for the new initialization setting is compared with the average value for the initialization setting. If the selected initialization setting is the last initialization setting, the "YES" branch of decision block 620 is taken and the method ends in block 624.

Figure 7:
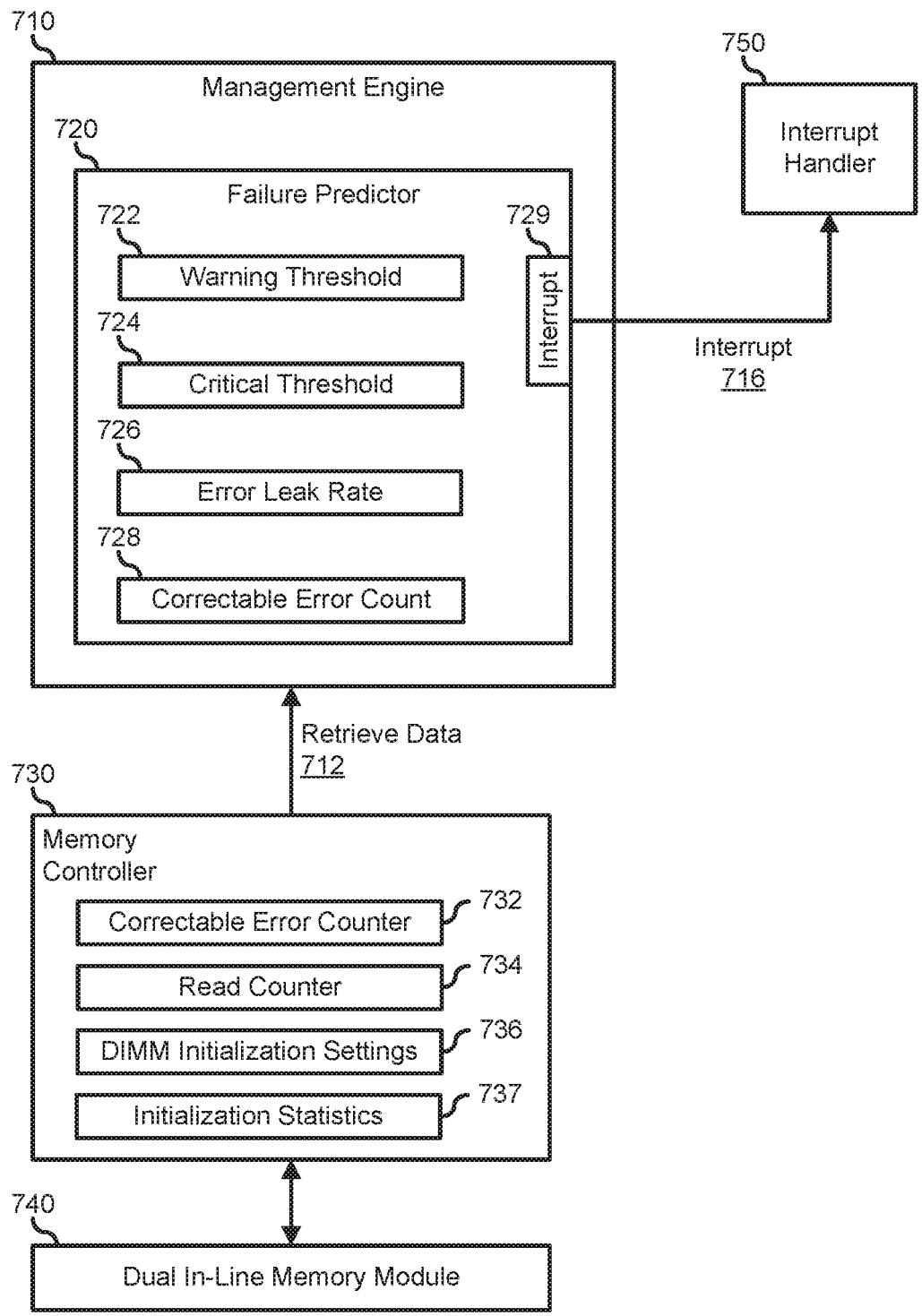
FIG. 7 is a block diagram illustrating an information handling system according to another embodiment of the present disclosure.

FIG. 7 illustrates an information handling system 700 similar to information handling system 100, and including a management engine 710, a memory controller 730, a dual in-line memory module (DIMM) 740, and an interrupt handler 750. Management engine 710 represents a processing element of information handling system 700 separate from the processor and from a service processor, that is configurable to provide various manufacturer designed functionality to the information handling system, such as an Intel Innovation Engine, an Intel Management Engine, an AMD Secure Technology element, an AMD Platform Security Processor, or another processing element as needed or desired. Memory controller 730 is similar to memory controller 130, operating to track the various operational metrics in relation to the memory operations performed on DIMM 740. As such, memory controller 730 includes a correctable error counter 732 similar to correctable error counter 132, a read counter 734 similar to read counter 134, a set of DIMM initialization settings 736 similar to DIMM initialization settings 136, and DIMM initialization statistics 737 similar to DIMM initialization statistics 137. DIMM 740 is similar to DIMM 140. Interrupt handler 750 is similar to interrupt handler 110. When memory controller 730 issues a memory read to DIMM 740, the memory controller increments read counter 734.

Information handling system 700 operates to provide a prediction mechanism for when DIMM 740 may be likely to start exhibiting uncorrectable errors. In particular, management engine 710 includes a failure predictor 720 similar to failure predictor 120, that operates to provide progressive warnings as to the health of DIMM 740. Failure predictor 720 includes a warning threshold 722 similar to warning threshold 122, a critical threshold 724 similar to critical threshold 124, an error leak rate 726 similar to error leak rate 126, a correctable error count 728 similar to correctable error count 128, and an interrupt generator 729. Failure predictor 720 operates to retrieve the correctable error count information from correctable error counter 732 and read counter information from read counter 736, to implement a failure prediction algorithm to accumulate the number of correctable errors and to provide various warnings when the number of accumulated errors exceeds one or more of warning threshold 722 and critical threshold 724. An example of a failure prediction algorithm includes a leaky-bucket algorithm as described above. If the number of collected correctable errors exceeds warning threshold 722, then interrupt generator 729 issues a warning interrupt 716 to interrupt handler 750 indicating that the number of collected correctable errors exceeds the warning threshold. If further, the number of collected correctable errors continues to increase and exceeds critical threshold 124, then interrupt generator 729 issues a critical interrupt 714 to interrupt handler 750 indicating that the number of collected correctable errors exceeds the critical threshold. When interrupt handler 750 receives either error warnings 714, information handling system 700 can provide an indication to a data center service technician that the DIMM is likely to fail. Note that a failure predictor similar to failure predictor 720 can be implemented in management engine 710 for each DIMM 740 of information handling system 700, and the parameters of the warning threshold, the critical threshold, and the error leak rate can be set individually for each DIMM based upon the type of DIMM, the age of the DIMM, the number of reads that have been experienced by the DIMM, or in accordance with other parameters of the DIMMs, as needed or desired. It will be further understood that error leak rate 726 may also include a number of errors by which to decrement correctable error counter 728 that is greater than or equal to one, as needed or desired.

Failure predictor 720, by retrieving the correctable error count information from correctable error counter 732, generates the correctable error count information based upon prior retrievals of the correctable error count information, and subtracting the prior correctable error count information from the current correctable error count information. However, because correctable error counter 732 is typically implemented as a register of a fixed bit-length, a situation may arise where, between retrievals of the correctable error count information from the correctable error counter, the correctable error counter may have overflowed and continued the count of correctable errors at zero. As such, failure predictor 720 needs to account for the possibility that the current correctable error count information is less than the prior correctable error count information. In a first embodiment, this situation is handled by providing an overflow indication in memory controller 730 that is set when correctable error counter 732 overflows. Then, when failure predictor 720 retrieves the correctable error count information, memory controller 730 also provides the overflow indication. Then, failure predictor 720 operates to take an overflow into account when determining the correctable error count for correctable error counter 732. In another embodiment, failure predictor 720 is configured to poll memory controller 730 at a rate that guarantees that multiple overflow events can not happen in correctable error counter 734. For example, if correctable error counter 732 is a four-bit counter, then failure predictor 720 can be configured to retrieve the information from correctable error counter 732 in an amount of time that it takes to process at most 16 ($2^4$) memory read operations.

Figure 8:
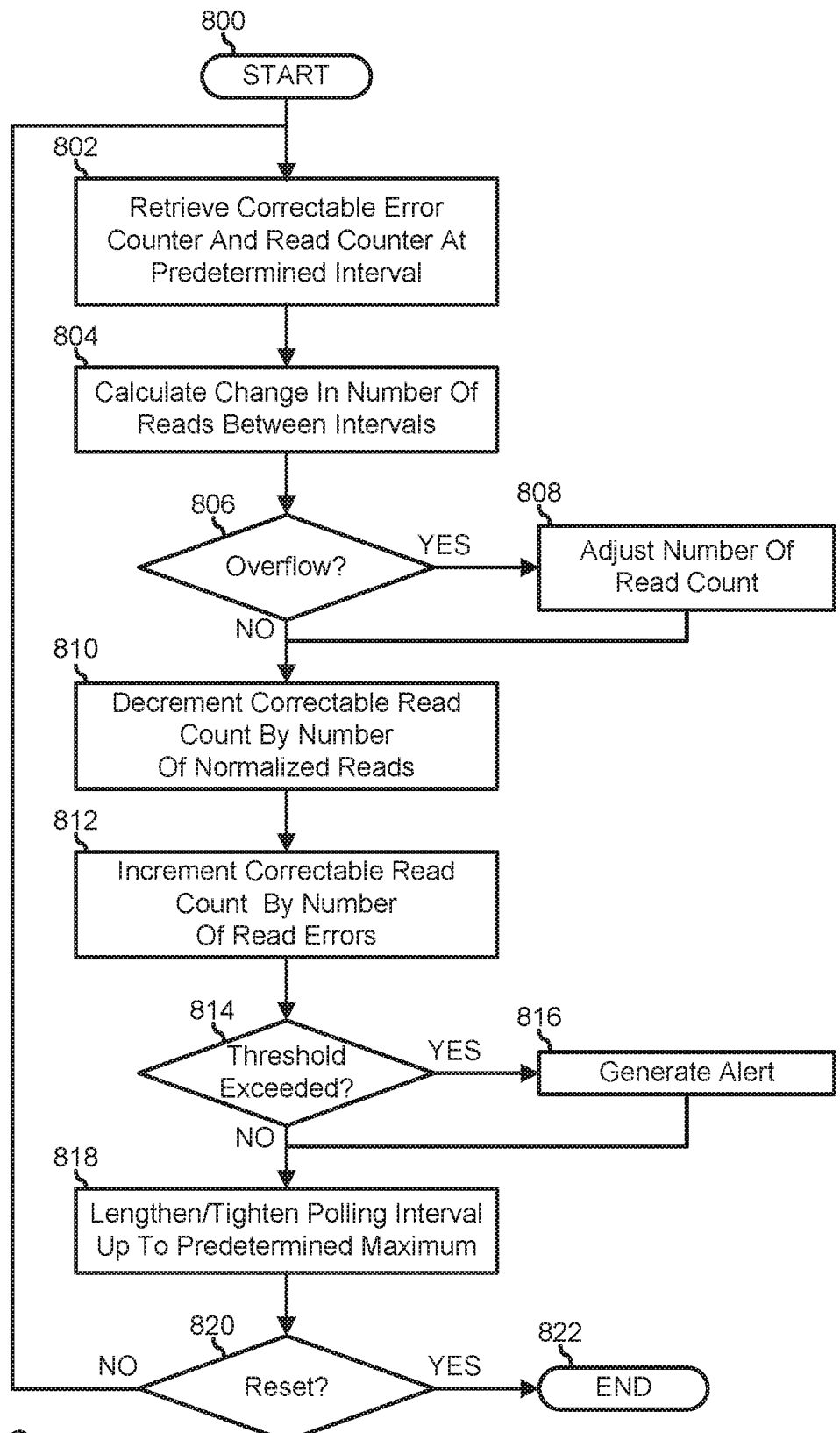
FIG. 8 is a flowchart illustrating a method for controlling memory failure handling in a DIMM of the information handling system of FIG. 4.

In another embodiment, failure predictor 720 provides a method for controlling memory failure handling as illustrated in the method of FIG. 8, starting at block 800. Values from a correctable read error counter and a read counter are retrieved at a predetermined interval from a memory controller in block 802. For example, management engine 710 can periodically retrieve the value from correctable read counter 732 and from read counter 734. A change in the number of reads since a previous pre-determined interval can be calculated in block 804, and a decision is made as to whether or not the value from the read counter has overflowed in decision block 806. If so, the "YES" branch of decision block 806 is taken, the read count value is adjusted to account for the overflow in block 808, and the method proceeds to block 810, described below.

If the value from the read counter has not overflowed, the "NO" branch of decision block 806 is taken and the method proceeds to block 810. When the "NO" branch of decision block 806 is taken or after the read count value is adjusted in block 808, a correctable read error count is decremented by a normalized number of reads in block 810. For example, management engine 710 can implement a leak rate of one (1) correctable read error every 100 thousand reads. Here, management engine 710 can divide the actual number of reads performed during the pre-determined interval by 100 thousand, and subtract that number from correctable error count register 728 to implement the leak rate action. The correctable read error count is incremented by the number of correctable read errors retrieved from the correctable read error counter in block 812. For example, management engine 710 can add the number of correctable read errors retrieved from correctable read error counter 732 to the value of correctable read error count 728 to implement the error collection. A decision is made as to whether or not the correctable read error count exceeds a warning threshold or a critical threshold in decision block 814. If so, the "YES" branch of decision block 814 is taken, an alert is generated in block 816, and the method proceeds to block 818 as described below.

If the correctable read error count does not exceed the warning threshold or the critical threshold in decision block 814, the "NO" branch of decision block 814 is taken and the method proceeds to block 818. When the "NO" branch of decision block 814 is taken, or after the alert is generated in block 816, the predetermined interval is lengthened or tightened in block 818. Whether the predetermined interval is lengthened or tightened depends on whether or not the read error count exceeds the warning threshold. If the read error count did not exceed the threshold, then the predetermined time interval can be lengthened, while if the read error count exceeded the threshold, then the predetermined time interval can be tightened. A decision is made as to whether or not the system has been reset in block 820. If not, the "NO" branch of decision block 820 is taken and the method returns to block 802 the values from the correctable read error counter and the read counter are retrieved at the next predetermined interval from the memory controller. If so, the "YES" branch of decision block 820 is taken and the method ends in block 822.

In another embodiment, management engine 710 receives an interrupt each time memory controller 730 receives a correctable error. Here, failure predictor 720 operates similarly to failure predictor 120 as described above, but only generates interrupt 716 when one of warning threshold 722 or critical threshold 724 is exceeded. In this way, interrupt handler 750 receives fewer interrupts than does interrupt handler 110, and the load from processing correctable error interrupts on the processor of information handling system 700 is less than for the processor of information handling system 100, because the processing of correctable error interrupts from memory controller 730 are filtered by failure predictor 720, and only the correctable errors that exceed a threshold are processed by the processor of information handling system 700.

Figure 9:
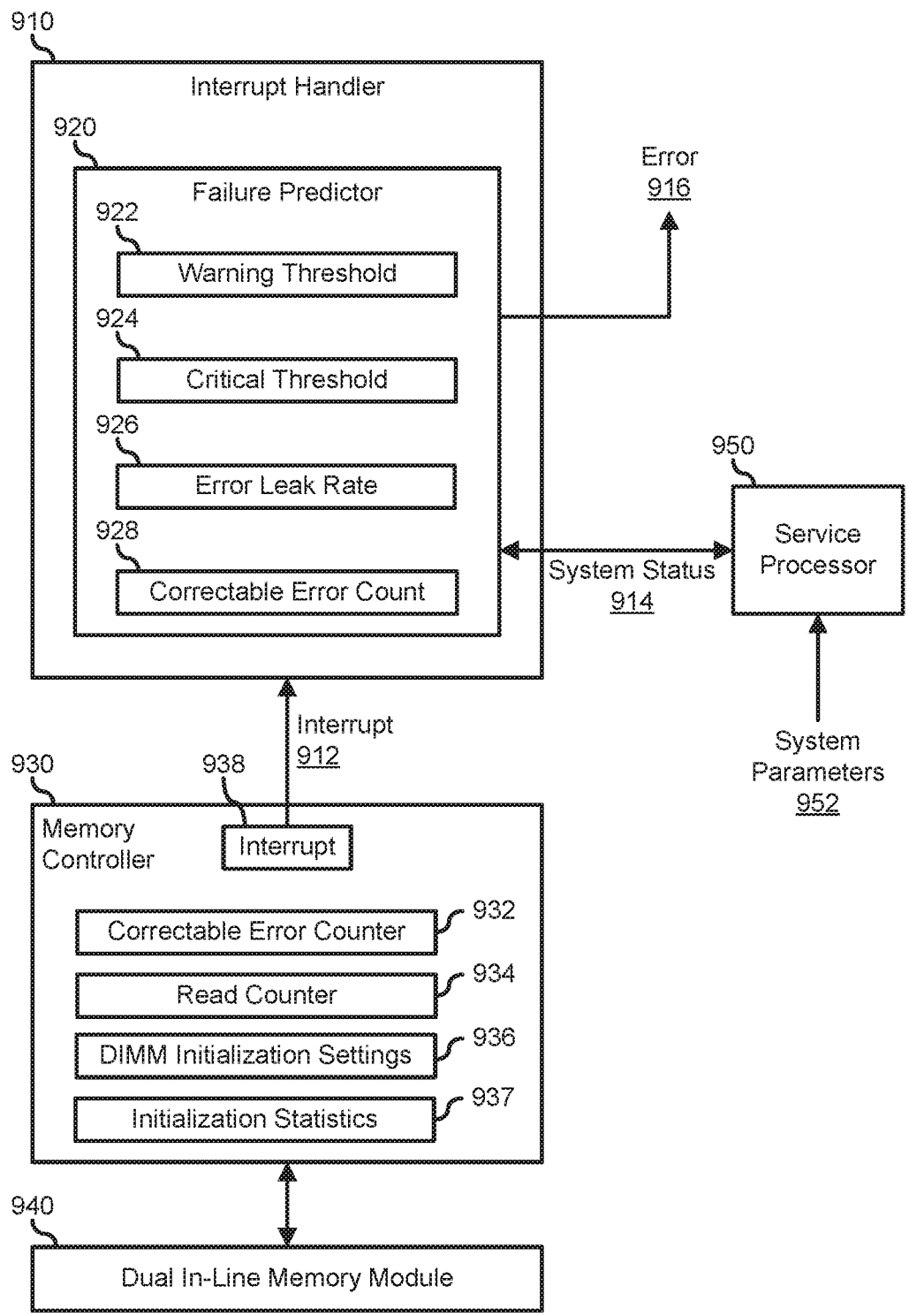
FIG. 9 is a block diagram illustrating an information handling system according to another embodiment of the present disclosure.

FIG. 9 illustrates an information handling system 900 similar to information handling system 100, and including a interrupt controller 910, a memory controller 930, a dual in-line memory module (DIMM) 940, and a service processor 950. Interrupt controller 910 is similar to interrupt controller 110, and includes a failure predictor 920 similar to failure predictor 120. Memory controller 930 is similar to memory controller 130, operating to track the various operational metrics in relation to the memory operations performed on DIMM 940. As such, memory controller 930 includes a correctable error counter 932 similar to correctable error counter 132, a read counter 934 similar to read counter 134, a set of DIMM initialization settings 936 similar to DIMM initialization settings 136, and DIMM initialization statistics 937 similar to DIMM initialization statistics 137, and an interrupt generator 938 similar to interrupt generator 138. DIMM 940 is similar to DIMM 140. When memory controller 930 issues a memory read to DIMM 940, the memory controller increments read counter 434. Then, memory controller 930 receives a data for a memory read transaction that includes error that can be corrected based upon the ECC bits, the memory controller increments correctable error counter 932 and interrupt generator 938 provides an interrupt 912 to interrupt handler 910 indicating that the memory controller has received a correctable error from DIMM 940. This interrupt can be called a correctable error interrupt. Correctable error counter 932, and read counter 934 can be read by the processor of information handling system 900, for example, in response to an interrupt service routine of interrupt handler 910, by service processor 950, or by other mechanisms of the information handling system.

Service processor 950 represents a service processor separate from the processor of information handlings system 900 that provides the data processing functionality of the information handling system, that operates to monitor, manage, and control various system level features of the information handling system, such as processor and system voltage levels, system temperatures, system fan speeds, firmware upgrades, and other operations. In a particular embodiment, service processor 950 operates in accordance with an Intelligent Platform Management Interface (IPMI) specification.

Information handling system 900 operates to provide a prediction mechanism for when DIMM 940 may be likely to start exhibiting uncorrectable errors. In particular, interrupt handler 910 includes a failure predictor 920 similar to failure predictor 120, that operates to provide progressive warnings as to the health of DIMM 940. Failure predictor 920 includes a warning threshold 922 similar to warning threshold 122, a critical threshold 924 similar to critical threshold 124, an error leak rate 926 similar to error leak rate 126, and a correctable error count 928 similar to correctable error count 128.

Failure predictor 920 operates to implement a failure prediction algorithm to accumulate the number of correctable errors and to provide various warnings when the number of accumulated errors exceeds one or more of warning threshold 922 and critical threshold 924. An example of a failure prediction algorithm includes a leaky-bucket algorithm. In implementing the leaky-bucket algorithm, failure predictor 920 operates to increase the number of correctable errors accumulated in correctable error count 928, sometimes referred to as the "bucket," each time interrupt generator 938 of memory controller 930 generates a correctable error interrupt 912, and to periodically decrease the number of correctable errors accumulated in the correctable error count based upon error leak rate 926. Failure predictor 920 further operates to compare the number of collected correctable errors as found in correctable error count 928 with warning threshold 922 and with critical threshold 924. If the number of collected correctable errors exceeds warning threshold 922, then failure predictor 920 issues an error indication 914 indicating that the number of collected correctable errors exceeds the warning threshold. If further, the number of collected correctable errors continues to increase and exceeds critical threshold 924, then failure predictor 920 issues an error indication 916 indicating that the number of collected correctable errors exceeds the critical threshold. When information handling system 900 receives either error warnings 914, the information handling system can provide an indication to a data center service technician that the DIMM is likely to fail. Note that a failure predictor similar to failure predictor 910 can be implemented in interrupt handler 910 for each DIMM 940 of information handling system 900, and the parameters of the warning threshold, the critical threshold, and the error leak rate can be set individually for each DIMM based upon the type of DIMM, the age of the DIMM, the number of reads that have been experienced by the DIMM, or in accordance with other parameters of the DIMMs, as needed or desired. It will be further understood that error leak rate 926 may also include a number of errors by which to decrement correctable error counter 928 that is greater than or equal to one, as needed or desired.

Figure 10:
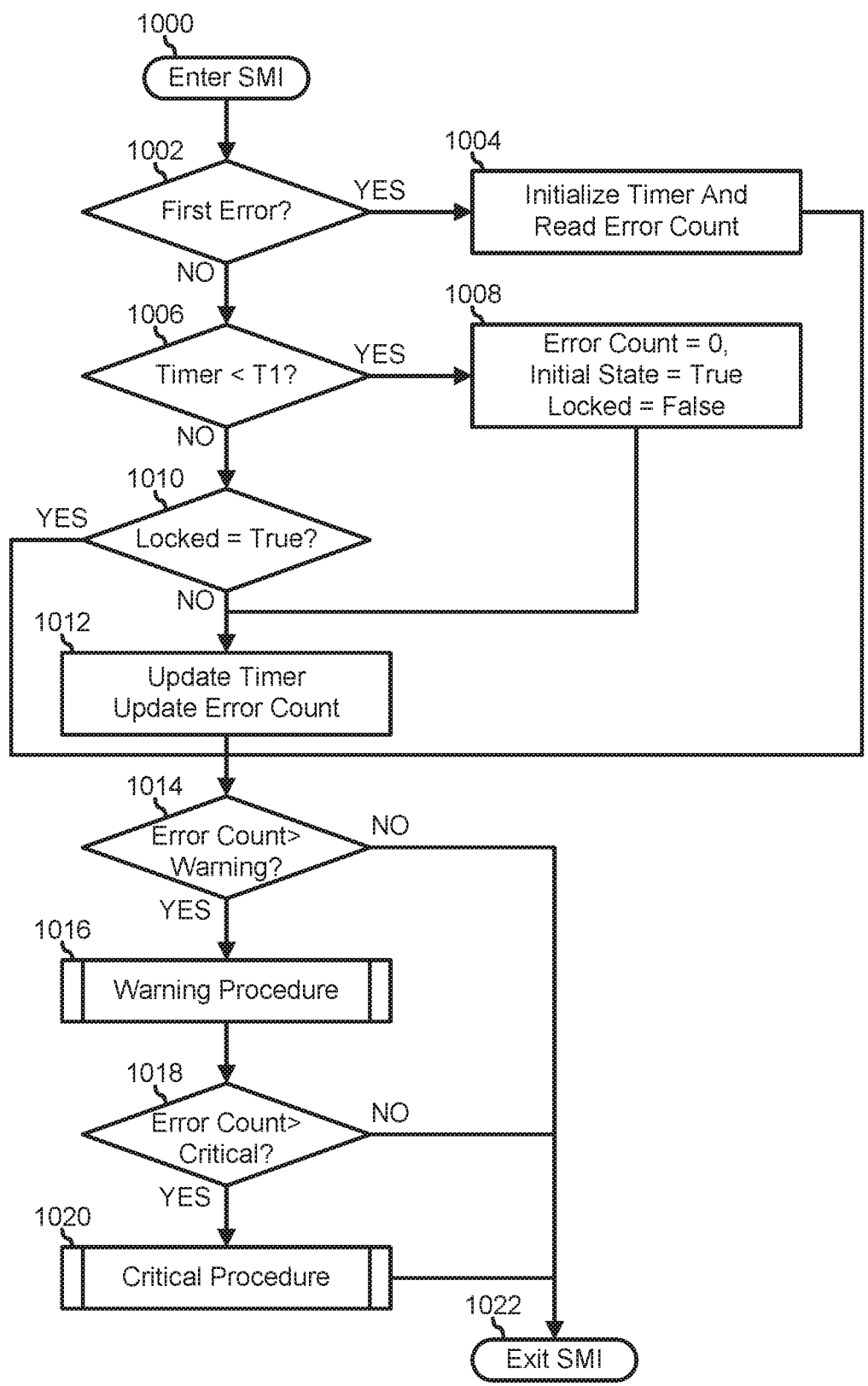
FIGS. 10-12 provide a flowchart illustrating a method for controlling memory failure handling in a DIMM of the information handling system of FIG. 6.
Figure 11:
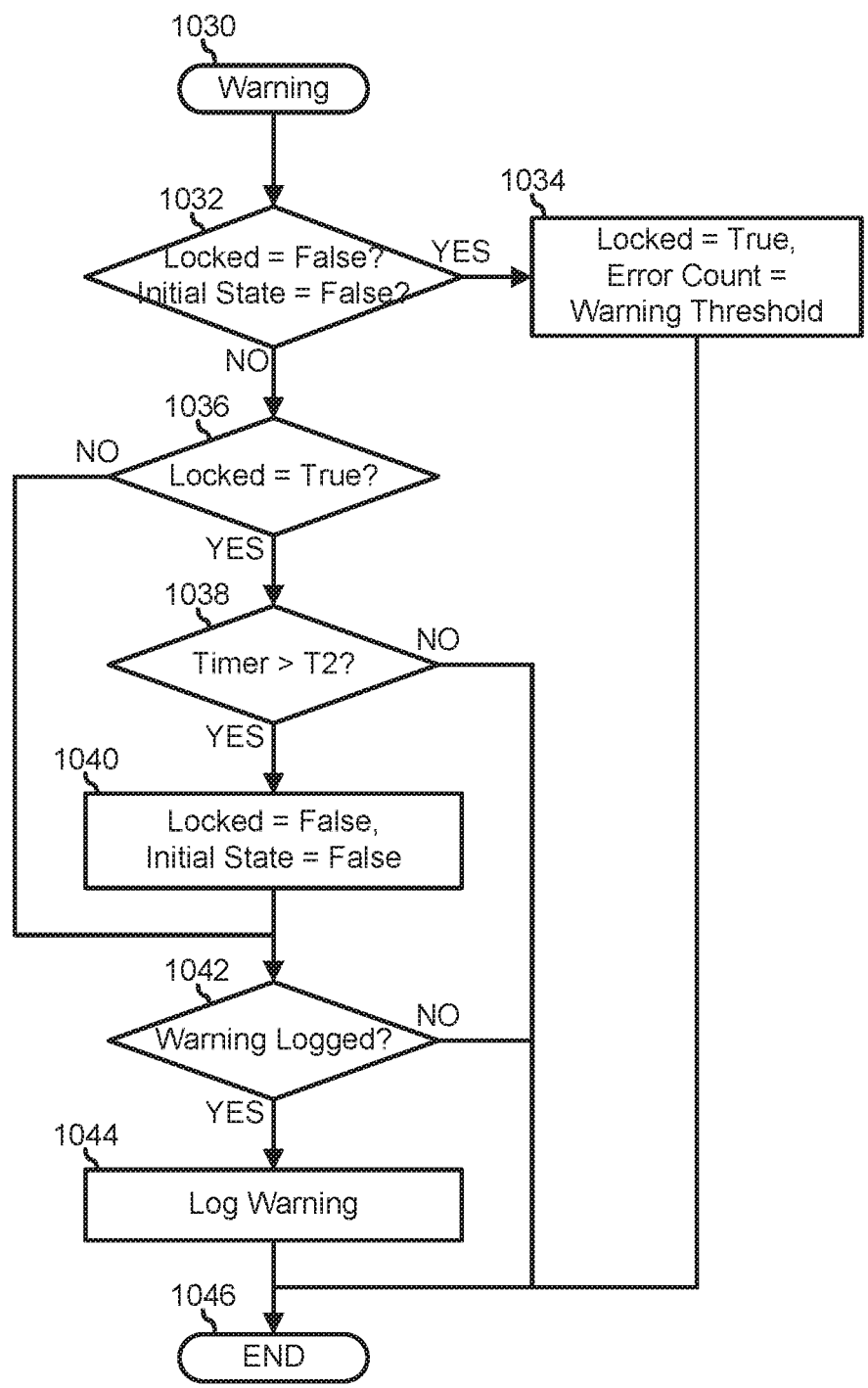
Figure 12:
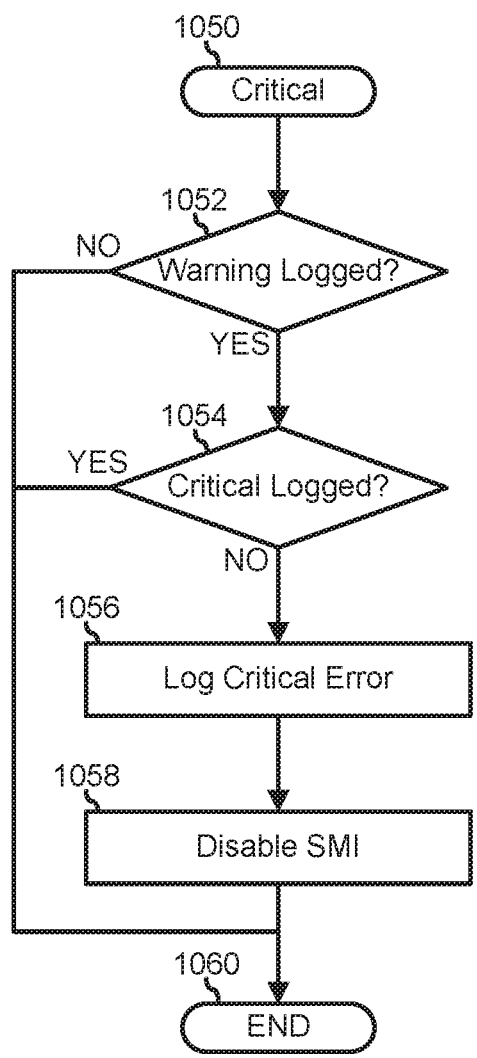

FIGS. 10-12 illustrate a method for controlling memory failure handling starting at block 1000, where a correctable error interrupt has been received and an interrupt handler has invoked a failure predictor to implement the leaky-bucket algorithm. A decision is made as to whether or not the correctable error was a first correctable error in decision block 1002. When the correctable error was the first correctable error, the "YES" branch of decision block 1002 is taken and a timer, a read error count are initialized in block 1004, and the method proceeds to decision block 1014 where a decision is made as to whether or not the read error count is greater than a warning threshold. Since the correctable error was the first correctable error, the "NO" branch of decision block 1012 is taken and the interrupt handler exits the method in block 1022.

When the correctable error was not the first correctable error, the "NO" branch of decision block 1006 is taken and a decision is made as to whether or not the timer value is less than a leak rate (T1) in decision block 1006. If so the "YES" branch of decision block 1006 is taken, the read error count is set to zero (0), an initial state is set to "TRUE", and a locked state is set to "FALSE" in block 1008, and the method proceeds to block 1012 as described below. If the timer value is not less than the leak rate, the "NO" branch of decision block 1006 is taken and a decision is made as to whether or not the locked state is "TRUE" in decision block 1010. If not, that is, if the locked state is "FALSE", the "NO" branch of decision block 1010 is taken. When the "NO" branch of decision block 1010 is taken, or when the read error count, the initial state, and the locked state are set in block 1008, the timer is updated and the read error count is incremented in block 1012. If the locked state is "TRUE", the "YES" branch of decision block 1010 is taken.

When the "YES" branch of decision block 1010 is taken, when the timer and the read error count are modified in block 1012, or when the timer and the read error count are initialized in block 1004, a decision is made as to whether or not the read error count value is greater than a warning threshold in decision block 1014. If not, the "NO" branch of decision block 1014 is taken and the interrupt handler exits the method in block 1022. If the read error count value is greater than the warning threshold, the "YES" branch of decision block 1014 is taken and a warning procedure 1016 is performed, as shown in FIG. 8 and described below, and a decision is made as to whether or not the read error count value is greater than a critical threshold in decision block 1018. If not, the "NO" branch of decision block 1018 is taken and the interrupt handler exits the method in block 1022. If the read error count value is greater than the critical threshold, the "YES" branch of decision block 1018 is taken, a critical procedure 1020 is performed, as shown in FIG. 9 and described below, and the interrupt handler exits the method in block 1022.

FIG. 11 illustrates warning procedure 1016 starting at block 1030. A decision is made as to whether or not the locked state is "FALSE" and the initial state is "FALSE" in decision block 1032. If both the locked state is "FALSE" and the initial state is "FALSE," the "YES" branch of decision block 1032 is taken, the locked state is set to "TRUE" and the read error count is set to the warning threshold in block 1034, and warning procedure 1017 ends in block 1046. If either the locked state is not "FALSE" or the initial state is not "FALSE," i.e., if either the of locked state or the initial state are "TRUE," the "NO" branch of decision block 1032 is taken, and a decision is made as to whether or not the locked state is "TRUE" in decision block 1036. If not, the "NO" branch of decision block 1036 is taken and the method proceeds to decision block 1042, as described below. If the locked state is "TRUE," the "YES" branch of decision block 1036 is taken and a decision is made as to whether or not the timer value is greater than a suspend duration (T2) in decision block 1038. If not, the "NO" branch of decision block 1038 is taken and warning procedure 1016 ends in block 1046. If the timer value is greater than the suspend duration (T2), the "YES" branch of decision block 1038 is taken, the locked state is set to "FALSE" and the initial state is set to "FALSE" in block 1040, and the method proceeds to decision block 1040. When either the "NO" branch of decision block 1036 is taken, or the locked and initial states are set to "FALSE" in block 1040, a decision is made as to whether or not the warning event has been logged in decision block 1042. If not, the "NO" branch of decision block 1042 is taken and warning procedure 1016 ends in block 1046. If the warning event as not been logged, the "NO" branch of decision block 1042 is taken, the warning is logged in block 1044, and warning procedure 1016 ends in block 1046.

FIG. 12 illustrates critical procedure 1020 starting at block 1050. A decision is made as to whether or not the warning event has been logged in decision block 1052. If not, the "NO" branch of decision block 1052 is taken and critical procedure 1020 ends in block 1060. If the warning event has been logged, the "YES" branch of decision block 1052 is taken and a decision is made as to whether or not the critical event has been logged in decision block 1054. If so, the "YES" branch of decision block 1054 is taken and critical procedure 1020 ends in block 1060. If the critical event has not been logged, the "NO" branch of decision block 1054 is taken, the critical event is logged in block 1056, further interrupts are disabled in block 1058, and critical procedure 1020 ends in block 1060.

Figure 13:
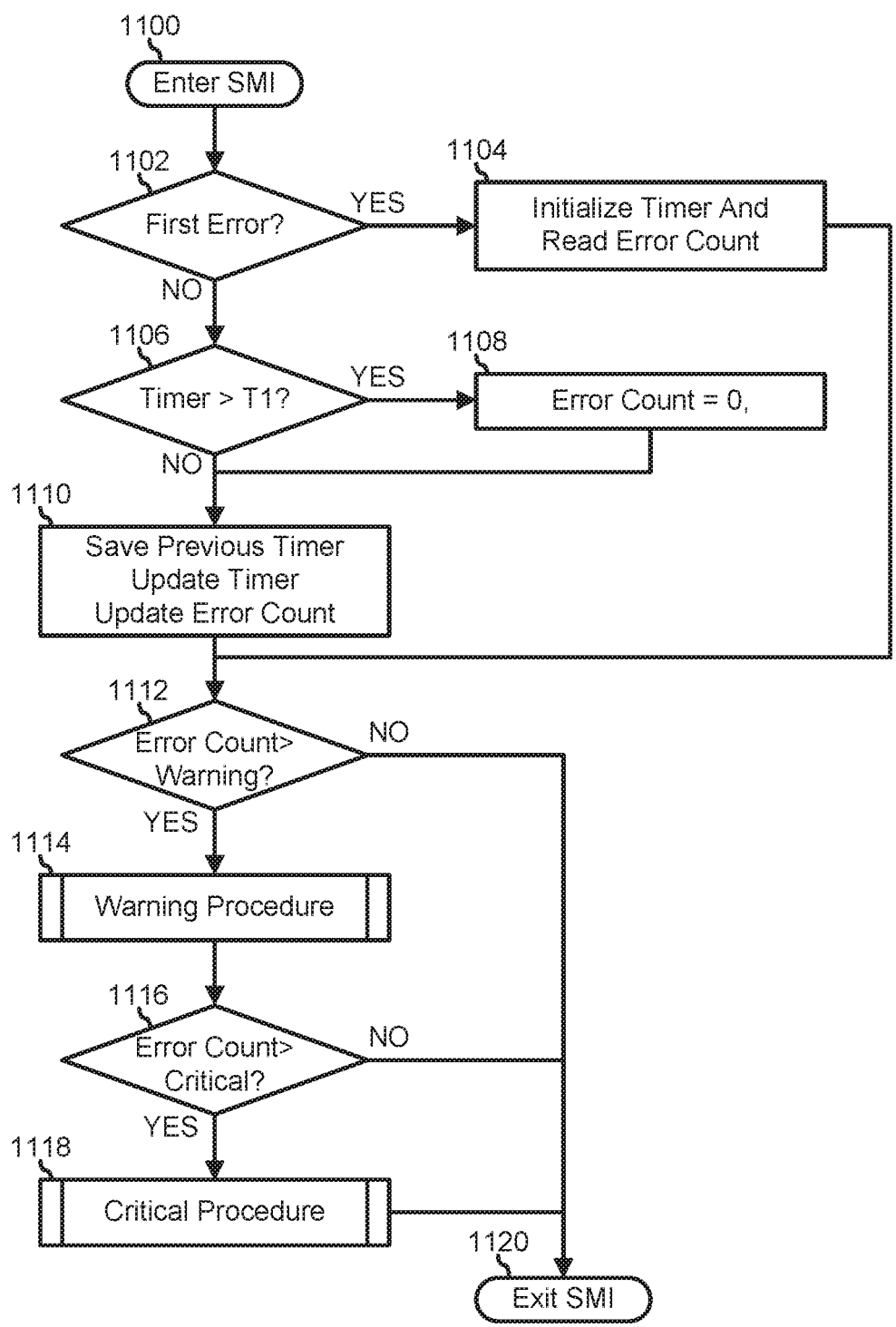
FIGS. 13-15 provide a flowchart illustrating another method for controlling memory failure handling in a DIMM of the information handling system of FIG. 6.
Figure 14:
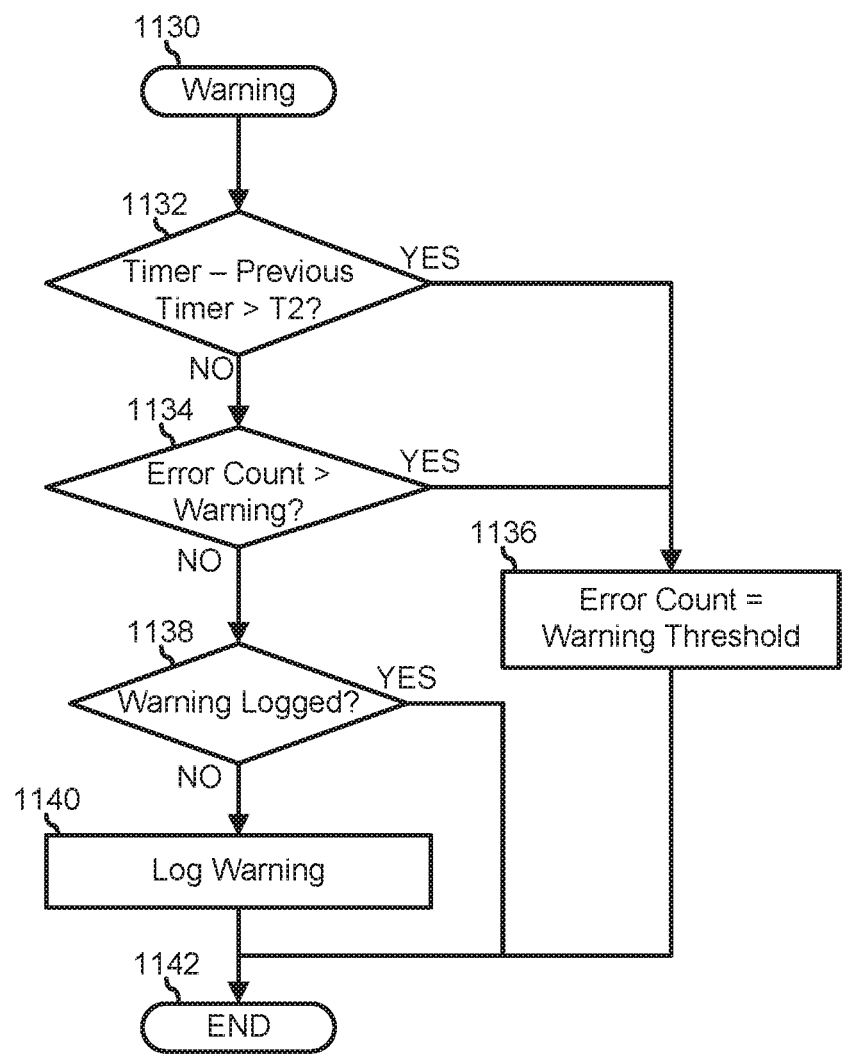
Figure 15:
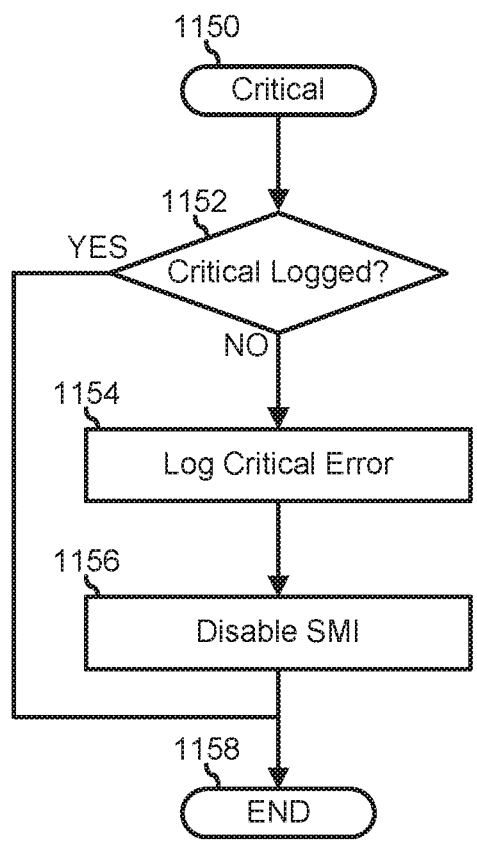

FIGS. 13-15 illustrate a method for controlling memory failure handling starting at block 1100, where a correctable error interrupt has been received and an interrupt handler has invoked a failure predictor to implement the leaky-bucket algorithm. A decision is made as to whether or not the correctable error was a first correctable error in decision block 1102. When the correctable error was the first correctable error, the "YES" branch of decision block 1102 is taken and a timer, a read error count are initialized in block 1104, and the method proceeds to decision block 1112 where a decision is made as to whether or not the read error count is greater than a warning threshold. Since the correctable error was the first correctable error, the "NO" branch of decision block 1112 is taken and the interrupt handler exits the method in block 1120.

When the correctable error was not the first correctable error, the "NO" branch of decision block 1102 is taken and a decision is made as to whether or not the timer value is less than a leak rate (T1) in decision block 1106. If so the "YES" branch of decision block 1106 is taken and the read error count is set to zero (0) in block 1108, and the method proceeds to block 1110 as described below. If the timer value is not less than the leak rate, the "NO" branch of decision block 1106 is taken and the method proceeds to block 1110. When the "NO" branch of decision block 1106 is taken, or when the read error is set in block 1108, the pervious timer value is saved, the timer is updated, and the read error count is incremented in block 1110.

A decision is made as to whether or not the read error count value is greater than a warning threshold in decision block 1112. If not, the "NO" branch of decision block 1112 is taken and the interrupt handler exits the method in block 1120. If the read error count value is greater than the warning threshold, the "YES" branch of decision block 1112 is taken and a warning procedure 1114 is performed, as shown in FIG. 11 and described below, and a decision is made as to whether or not the read error count value is greater than a critical threshold in decision block 1116. If not, the "NO" branch of decision block 1116 is taken and the interrupt handler exits the method in block 1120. If the read error count value is greater than the critical threshold, the "YES" branch of decision block 1116 is taken, a critical procedure 1118 is performed, as shown in FIG. 12 and described below, and the interrupt handler exits the method in block 1120.

FIG. 14 illustrates warning procedure 1114 starting at block 1130. A decision is made as to whether or not a difference between the previous timer, saved at block 1110, and the current timer, updated at block 1110, is greater than a suspend duration (T2) in decision block 1132. If so, the "YES" branch of decision block 1132 is taken, the error count is set to equal the warning threshold in block 1136, and the method ends in block 1142. If the difference between the previous timer and the current timer is not greater than the suspend duration (T2), the "NO" branch of decision block 1132 is taken and a decision is made as to whether or not the error count is grater than the warning threshold in decision block 1134. If so, the "YES" branch of decision block 1134 is taken, the error count is set to equal the warning threshold in block 1136, and the method ends in block 1142. If the error count is not grater than the warning threshold, the "NO" branch of decision block 1134 is taken and a decision is made as to whether or not the warning event has been logged in decision block 1138. If not, the "NO" branch of decision block 1138 is taken, the warning is logged in block 1140, and warning procedure 1114 ends in block 1142. If the warning event has been logged, the "YES" branch of decision block 1138 is taken and warning procedure 1114 ends in block 1142.

FIG. 15 illustrates critical procedure 1118 starting at block 1150. A decision is made as to whether or not the warning event has been logged in decision block 1152. If not, the "NO" branch of decision block 1152 is taken and critical procedure 1118 ends in block 1160. If the warning event has been logged, the "YES" branch of decision block 1152 is taken and a decision is made as to whether or not the critical event has been logged in decision block 1154. If so, the "YES" branch of decision block 1154 is taken and critical procedure 1118 ends in block 1160. If the critical event has not been logged, the "NO" branch of decision block 1154 is taken, the critical event is logged in block 1156, further interrupts are disabled in block 1158, and critical procedure 1118 ends in block 1160.

Figure 16:
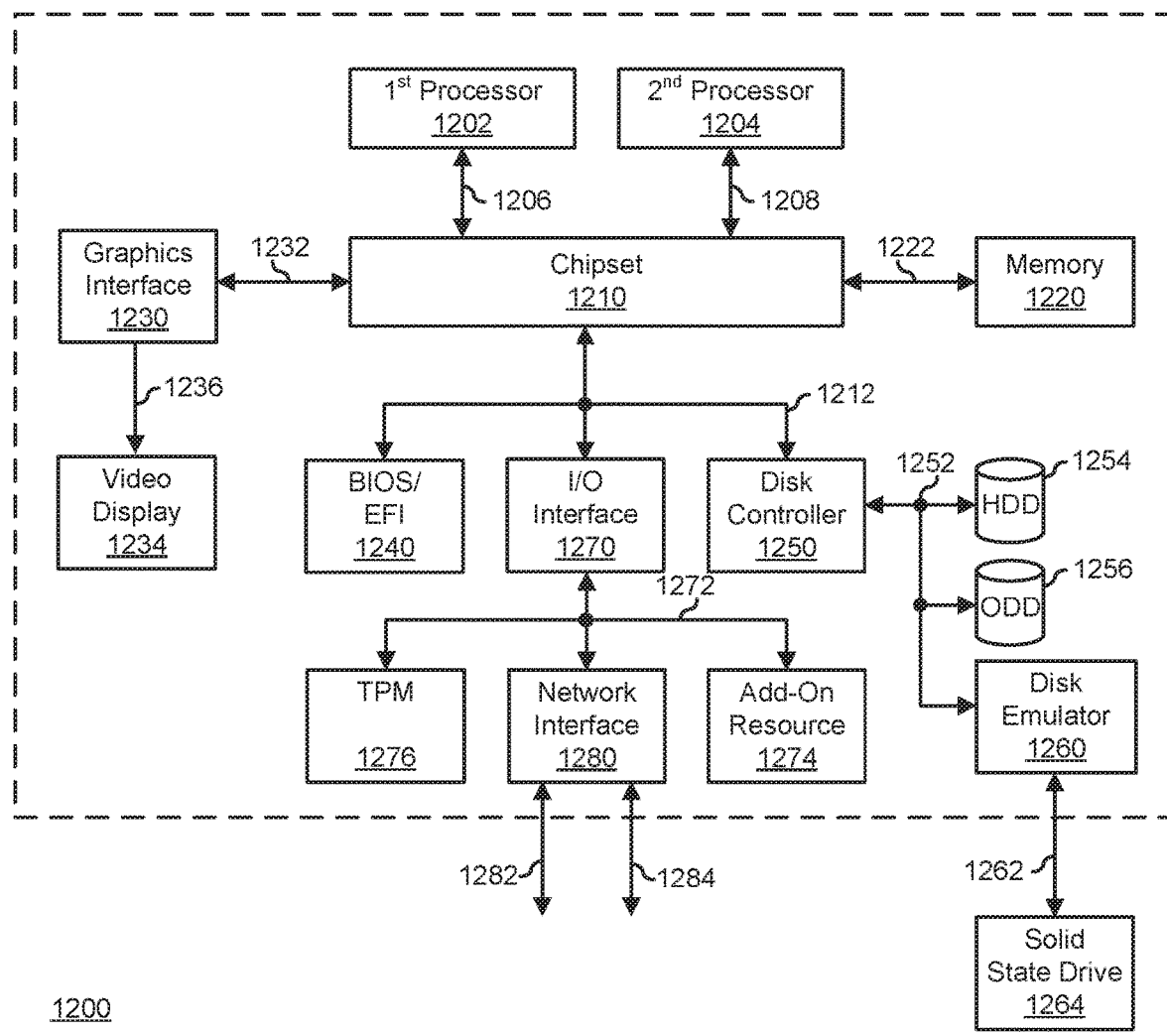
FIG. 16 is a block diagram illustrating a generalized information handling system according to an embodiment of the present disclosure.

FIG. 16 illustrates a generalized embodiment of information handling system 1200. For purpose of this disclosure information handling system 1200 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1200 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1200 can include processing resources for executing machine-executable code, such as a central processing unit (CPU), a programmable logic array (PLA), an embedded device such as a System-on-a-Chip (SoC), or other control logic hardware. Information handling system 1200 can also include one or more computer-readable medium for storing machine-executable code, such as software or data. Additional components of information handling system 1200 can include one or more storage devices that can store machine-executable code, one or more communications ports for communicating with external devices, and various input and output (I/O) devices, such as a keyboard, a mouse, and a video display. Information handling system 1200 can also include one or more buses operable to transmit information between the various hardware components.

Information handling system 1200 can include devices or modules that embody one or more of the devices or modules described above, and operates to perform one or more of the methods described above. Information handling system 1200 includes a processors 1202 and 1204, a chipset 1210, a memory 1220, a graphics interface 1230, include a basic input and output system/extensible firmware interface (BIOS/EFI) module 1240, a disk controller 1250, a disk emulator 1260, an input/output (I/O) interface 1270, and a network interface 1280. Processor 1202 is connected to chipset 1210 via processor interface 1206, and processor 1204 is connected to the chipset via processor interface 1208. Memory 1220 is connected to chipset 1210 via a memory bus 1222. Graphics interface 1230 is connected to chipset 1210 via a graphics interface 1232, and provides a video display output 1236 to a video display 1234. In a particular embodiment, information handling system 1200 includes separate memories that are dedicated to each of processors 1202 and 1204 via separate memory interfaces. An example of memory 1220 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 1240, disk controller 1250, and I/O interface 1270 are connected to chipset 1210 via an I/O channel 1212. An example of I/O channel 1212 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1210 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 1240 includes BIOS/EFI code operable to detect resources within information handling system 1200, to provide drivers for the resources, initialize the resources, and access the resources. BIOS/EFI module 1240 includes code that operates to detect resources within information handling system 1200, to provide drivers for the resources, to initialize the resources, and to access the resources.

Disk controller 1250 includes a disk interface 1252 that connects the disc controller to a hard disk drive (HDD) 1254, to an optical disk drive (ODD) 1256, and to disk emulator 1260. An example of disk interface 1252 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1260 permits a solid-state drive 1264 to be connected to information handling system 1200 via an external interface 1262. An example of external interface 1262 includes a USB interface, an IEEE 1394 (Firewire) interface, a proprietary interface, or a combination thereof. Alternatively, solid-state drive 1264 can be disposed within information handling system 1200.

I/O interface 1270 includes a peripheral interface 1272 that connects the I/O interface to an add-on resource 1274, to a TPM 1276, and to network interface 1280. Peripheral interface 1272 can be the same type of interface as I/O channel 1212, or can be a different type of interface. As such, I/O interface 1270 extends the capacity of I/O channel 1212 when peripheral interface 1272 and the I/O channel are of the same type, and the I/O interface translates information from a format suitable to the I/O channel to a format suitable to the peripheral channel 1272 when they are of a different type. Add-on resource 1274 can include a data storage system, an additional graphics interface, a network interface card (NIC), a sound/video processing card, another add-on resource, or a combination thereof. Add-on resource 1274 can be on a main circuit board, on separate circuit board or add-in card disposed within information handling system 1200, a device that is external to the information handling system, or a combination thereof.

Network interface 1280 represents a NIC disposed within information handling system 1200, on a main circuit board of the information handling system, integrated onto another component such as chipset 1210, in another suitable location, or a combination thereof. Network interface device 1280 includes network channels 1282 and 1284 that provide interfaces to devices that are external to information handling system 1200. In a particular embodiment, network channels 1282 and 1284 are of a different type than peripheral channel 1272 and network interface 1280 translates information from a format suitable to the peripheral channel to a format suitable to external devices. An example of network channels 1282 and 1284 includes InfiniBand channels, Fibre Channel channels, Gigabit Ethernet channels, proprietary channel architectures, or a combination thereof. Network channels 1282 and 1284 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor;
a dual in-line memory module (DIMM); and
a memory controller coupled to the DIMM, the memory controller configured to provide interrupts to the processor each time a read transaction from the DIMM results in a correctable read error;
wherein the processor is configured to instantiate a failure predictor, the failure predictor to receive the interrupts, to accumulate a count of the interrupts, and to provide a first error indication when the count exceeds a first error threshold, wherein in accumulating the count the failure predictor increments the count each time the predictor receives a particular interrupt and decrements the count in accordance with an error leak rate, and wherein the error leak rate has a first value when a training coefficient for the DIMM is greater than a first deviation threshold, and has a second value when the training coefficient for the DIMM is less than the first deviation threshold.

2. The information handling system of claim 1, wherein the first value of the error leak rate provides a faster leak rate than the second value of the leak rate.

3. The information handling system of claim 2, wherein the error leak rate has the second value when the training coefficient for the DIMM is also greater than a second deviation threshold, and has a third value when the training coefficient for the DIMM is less than the second deviation threshold.

4. The information handling system of claim 3, wherein the second value of the error leak rate provides a faster leak rate than the third value of the leak rate.

5. The information handling system of claim 1, wherein the first deviation threshold is determined based upon an average value for the training coefficient.

6. The information handling system of claim 5, wherein the first deviation threshold is determined as a first standard deviation from the average value.

7. The information handling system of claim 1, wherein the failure predictor is further to provide a second error indication when the count exceeds a second error threshold, the second threshold higher than the first error threshold.

8. The information handling system of claim 1, wherein the training coefficient comprises one of a data bus impedance setting, a reference voltage setting, and a read/write timing setting.

9. The information handling system of claim 1, wherein the failure predictor is included in an interrupt handler of the information handling system.

10. The information handling system of claim 1, wherein the DIMM is a DDR5 DIMM.

11. A method of controlling memory failure handling, the method comprising:
providing, by a memory controller of an information handling system, interrupts to a processor of the information handling system each time a read transaction between the memory controller and a dual in-line memory module (DIMM) of the information handling system results in a correctable read error;
receiving, by a failure predictor instantiated by the processor, the interrupts;
accumulating, by the failure predictor, a count of the interrupts; and
providing, by the failure predictor, a first error indication when the count exceeds a first error threshold;

wherein the accumulating further includes:
  incrementing the count each time the predictor receives a particular interrupt; and
  decrementing the count in accordance with an error leak rate, wherein the error leak rate has a first value when a training coefficient for the DIMM is greater than a first deviation threshold, and has a second value when the training coefficient for the DIMM is less than the first deviation threshold.

12. The method of claim 11, wherein the first value of the error leak rate provides a faster leak rate than the second value of the leak rate.

13. The method of claim 12, wherein the error leak rate has the second value when the training coefficient for the DIMM is also greater than a second deviation threshold, and has a third value when the training coefficient for the DIMM is less than the second deviation threshold.

14. The method of claim 13, wherein the second value of the error leak rate provides a faster leak rate than the third value of the leak rate.

15. The method of claim 11, wherein the first deviation threshold is determined based upon an average value for the training coefficient.

16. The method of claim 15, wherein the first deviation threshold is determined as a first standard deviation from the average value.

17. The method of claim 11, further comprising:
  providing, by the failure predictor, a second error indication when the count exceeds a second error threshold, the second threshold higher than the first error threshold.

18. The method of claim 11, wherein the training coefficient comprises one of a data bus impedance setting, a reference voltage setting, and a read/write timing setting.

19. The method of claim 11, wherein the failure predictor is included in an interrupt handler of the information handling system.

20. An information handling system, comprising:
  a dual in-line memory module (DIMM) in accordance with a DDR5 standard; and
  a memory controller coupled to the DIMM, the memory controller configured to provide interrupts to a processor each time a read transaction from the DIMM results in a correctable read error;
  wherein the processor is configured to instantiate a failure predictor, the failure predictor to receive the interrupts, to accumulate a count of the interrupts, and to provide a first error indication when the count exceeds a first error threshold, wherein in accumulating the count, the failure predictor increments the count each time the predictor receives a particular interrupt and decrements the count in accordance with an error leak rate, and wherein the error leak rate has a first value when a training coefficient for the DIMM is greater than a first deviation threshold and has a second value when the training coefficient for the DIMM is less than the first deviation threshold, and wherein the first deviation threshold is determined based upon an average value for the training coefficient.

* * * * *